United States Patent [19]

Suzuki

[11] Patent Number: 5,042,324
[45] Date of Patent: Aug. 27, 1991

[54] CONTROL OF TORQUE GENERATED BY ENGINE FOLLOWED BY CONTINUOUSLY VARIABLE TRANSMISSION

[75] Inventor: Yutaka Suzuki, Atsugi, Japan

[73] Assignee: Nissan Motor Co., Ltd., Yokohama, Japan

[21] Appl. No.: 562,610

[22] Filed: Aug. 3, 1990

[30] Foreign Application Priority Data

Aug. 3, 1989 [JP] Japan .................. 1-200404

[51] Int. Cl.$^5$ ............ B60K 41/04; B60K 41/12; B60K 41/14
[52] U.S. Cl. ......................... 74/857; 74/858; 74/859; 74/866; 364/424.01; 364/426.01; 364/431.01; 364/431.03
[58] Field of Search ................ 74/858, 859, 866, 857

[56] References Cited

U.S. PATENT DOCUMENTS

| 3,913,418 | 10/1975 | Miyao et al. | 74/859 X |
|---|---|---|---|
| 4,291,594 | 9/1981 | Baudoin | 74/859 X |
| 4,370,904 | 2/1983 | Müller et al. | 74/858 |
| 4,403,527 | 9/1983 | Mohl et al. | 74/858 X |
| 4,515,040 | 5/1985 | Takeuchi et al. | 74/866 |
| 4,515,124 | 5/1985 | Hayashi | 74/859 X |
| 4,580,465 | 4/1986 | Omitsu | 74/859 X |
| 4,665,775 | 5/1987 | Nagamatsu et al. | 74/868 |
| 4,735,113 | 4/1988 | Yamamuro et al. | 74/866 |
| 4,736,655 | 4/1988 | Kumura et al. | 74/866 |
| 4,774,858 | 10/1988 | Ganoung | 74/859 |
| 4,793,217 | 12/1988 | Morisawa et al. | 74/866 |
| 4,862,771 | 9/1989 | Kumura et al. | 74/866 |
| 4,916,982 | 4/1990 | Suzuki | 74/866 |
| 4,964,318 | 10/1990 | Ganoung | 74/859 |

FOREIGN PATENT DOCUMENTS

| 57-37142 | 3/1982 | Japan | 74/859 |
|---|---|---|---|
| 60-95263 | 5/1985 | Japan | 74/866 |
| 63-203439 | 8/1988 | Japan | 74/859 |

Primary Examiner—Allan D. Herrmann
Assistant Examiner—David E. Henn
Attorney, Agent, or Firm—Foley & Lardner

[57] ABSTRACT

According to an engine torque control for a drive system including an engine followed by a continuously variable transmission, the engine torque drops quickly when the engine braking forward drive position (L range position) is set after a power demand on the engine has decreased to zero, while it drops less quickly after the power demand has decreased to zero when the normal forward drive position (D range position) is set.

5 Claims, 6 Drawing Sheets

CONTROL OF TORQUE GENERATED BY ENGINE FOLLOWED BY CONTINUOUSLY VARIABLE TRANSMISSION

BACKGROUND OF THE INVENTION

The present invention relates to a drive system for a motor vehicle, and more particularly to a drive system including an engine followed by a continuously variable transmission.

U.S. Pat. No. 4,735,113 issued to Yamamuro et al., on Apr. 5, 1988 discloses a drive system for a motor vehicle. This known drive system includes an engine followed by a continuously variable transmission. In such drive system, a control for the engine is independent from a control for the continuously variable transmission. In the event an accelerator pedal is released from a depressed position, a torque generated by the engine drops at a predetermined rate with respect to time regardless of a shift position which a manual valve of the continuously variable transmission is placed at. The manual valve has a plurality of shift positions including a normal forward drive position, namely D range position, and an engine braking forward drive position, namely L range position. If the setting is such that after the accelerator pedal has been released, the torque generated by the engine drops at a gradual rate to provide a good ride feel for operation with the manual valve placed at the D range position, an engine braking is insufficient after the accelerator pedal has been released with the manual valve placed at the L range position. On the other hand, if the torque generated by the engine drops at an increased rate with respect time with the manual valve placed at the D range position, the engine torque drops quicker than the continuously variable transmission shifts down. This induces a shock.

An object of the present invention is to improve a drive system for a motor vehicle including an engine followed by a continuously variable transmission such that after a power demand has disappeared, a torque generated by the engine drops in such a manner as to provide a good ride feel during operation of the continuously variable with a manual valve placed at normal forward drive range position and a sufficient engine braking during operation of the continuously variable transmission with the manual valve placed at engine braking forward drive position.

SUMMARY OF THE INVENTION

According to one aspect of the present invention, there is provided an apparatus for a control of a torque generated by an engine drivingly connected to a continuously variable transmission for a motor vehicle, the engine including a fuel supply system, the continuously variable transmission having a plurality of shift positions including a normal forward drive position and an engine braking forward drive position, the apparatus comprising:

means for generating a shift position indicative signal reflecting that one of the plurality of shift positions which the continuously variable transmission is conditioned in;

means for detecting a power demand on the engine and generating a power demand indicative signal indicative of a degree of said power demand detected; and means responsive to said shift position indicative signal and said power demand indicative signal for effecting a drop in torque generated by the engine at a first rate with respect to time when the continuously variable transmission is conditioned in the normal forward drive position after the power demand has decreased to zero, but at a second rate with respect to time when the continuously variable transmission is conditioned in the engine braking forward drive position upon a predetermined condition being satisfied after the power demand has decreased to zero, said second rate being greater than said first rate.

According to another aspect of the present invention, there is provided a method for a control of a torque generated by an engine drivingly connected to a continuously variable transmission for a motor vehicle, the engine including a fuel supply system, the continuously variable transmission having a plurality of shift positions including a normal forward drive position and an engine braking forward drive position, the method comprising the steps of:

generating a shift position indicative signal reflecting that one of the plurality of shift positions which the continuously variable transmission is conditioned in;

detecting a power demand on the engine and generating a power demand indicative signal indicative of a degree of said power demand detected; and effecting, responsive to said shift position indicative signal and said power demand indicative signal, a drop in torque generated by the engine at a first rate with respect to time when the continuously variable transmission is conditioned in the normal forward drive position after the power demand has decreased to zero, but at a second rate with respect to time when the continuously variable transmission is conditioned in the engine braking forward drive position upon a predetermined condition being satisfied after the power demand has decreased to zero, said second rate being greater than said first rate.

DETAILED DESCRIPTION OF THE INVENTION

Figure 1:
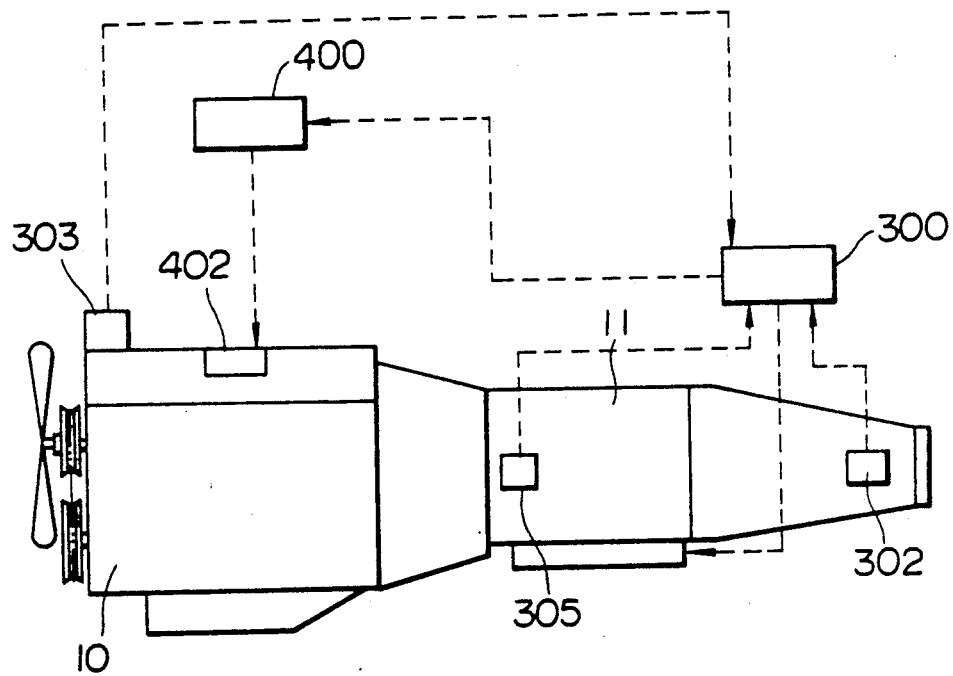
FIG. 1 is a diagram illustrating a drive system for a motor vehicle, the drive system including an engine followed by a continuously variable transmission.
Figure 2:
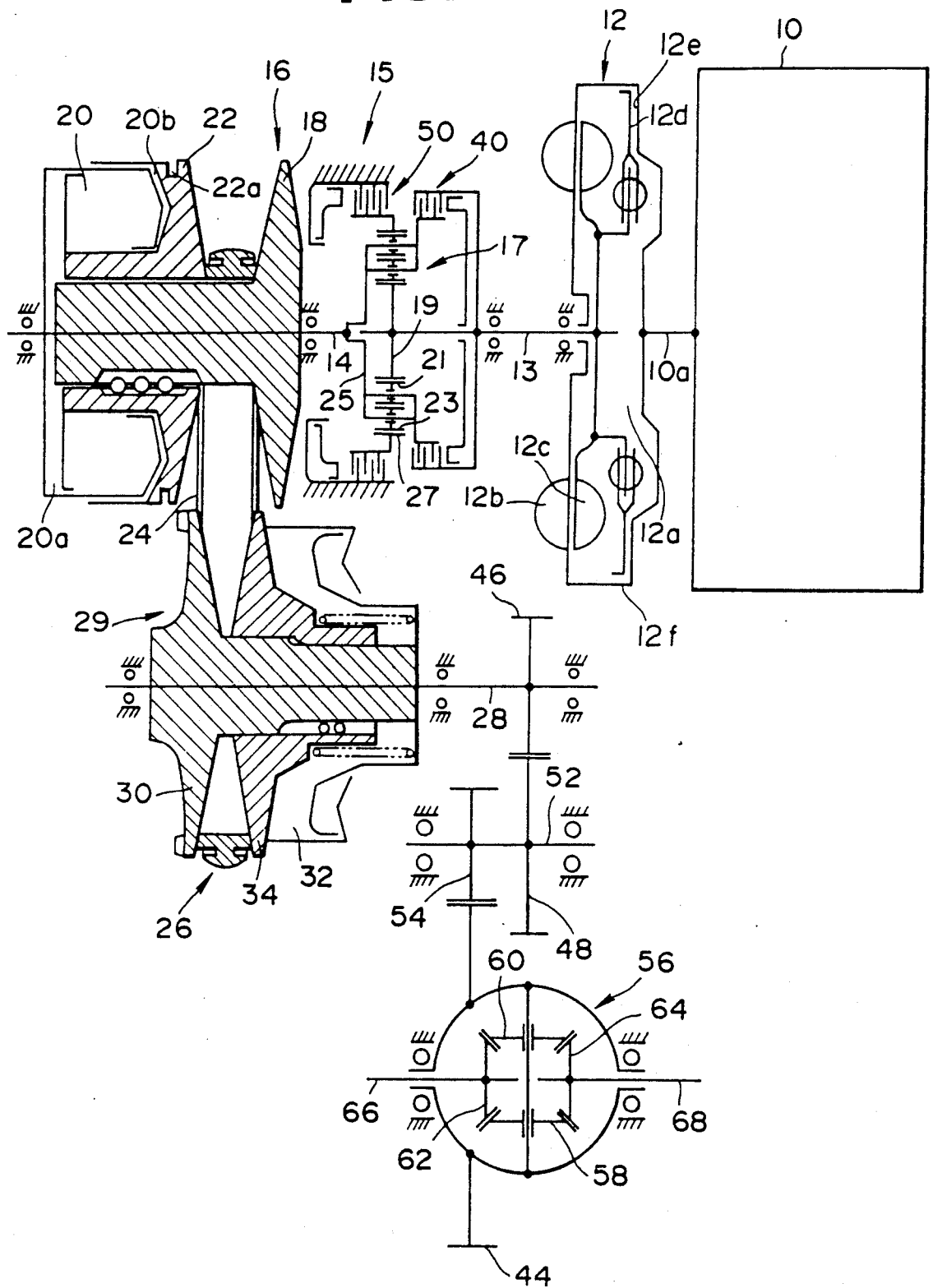
FIG. 2 is a schematic diagram showing the continuously variable transmission drivingly connected to the engine.
Figure 3A:
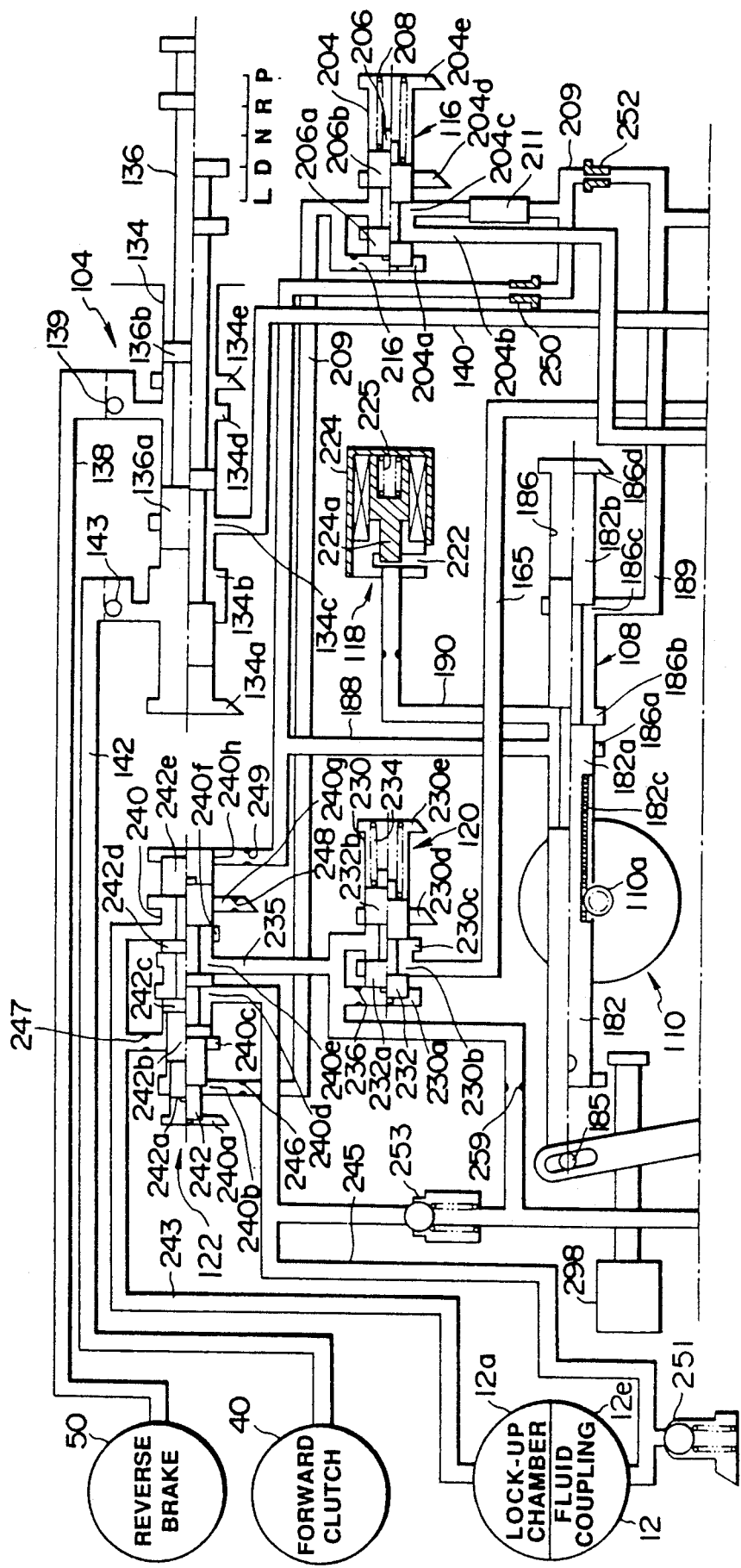
FIGS. 3A and 3B, when combined, are a hydraulic circuit illustrating a hydraulic control system for the continuously variable transmission.
Figure 3B:
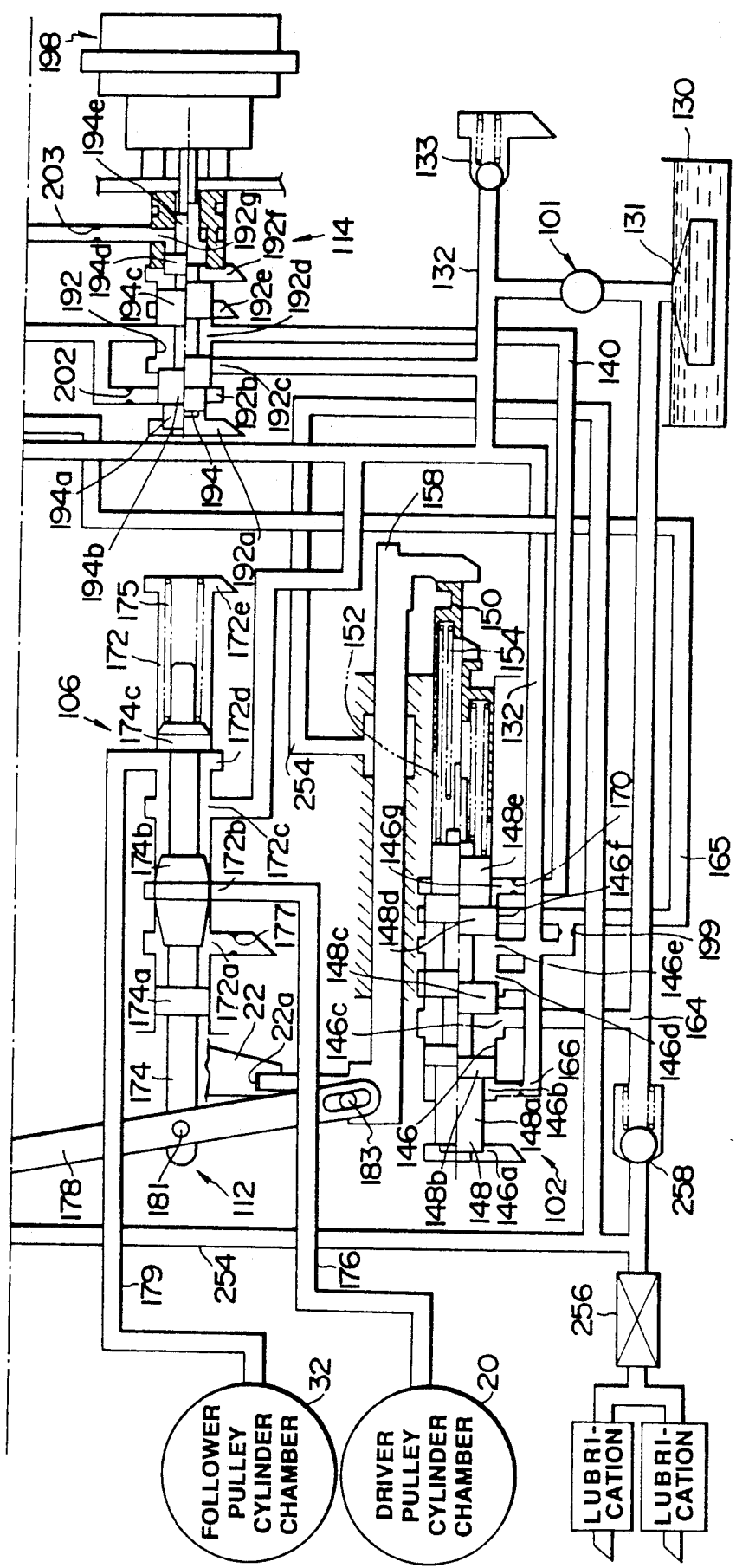
Figure 4:
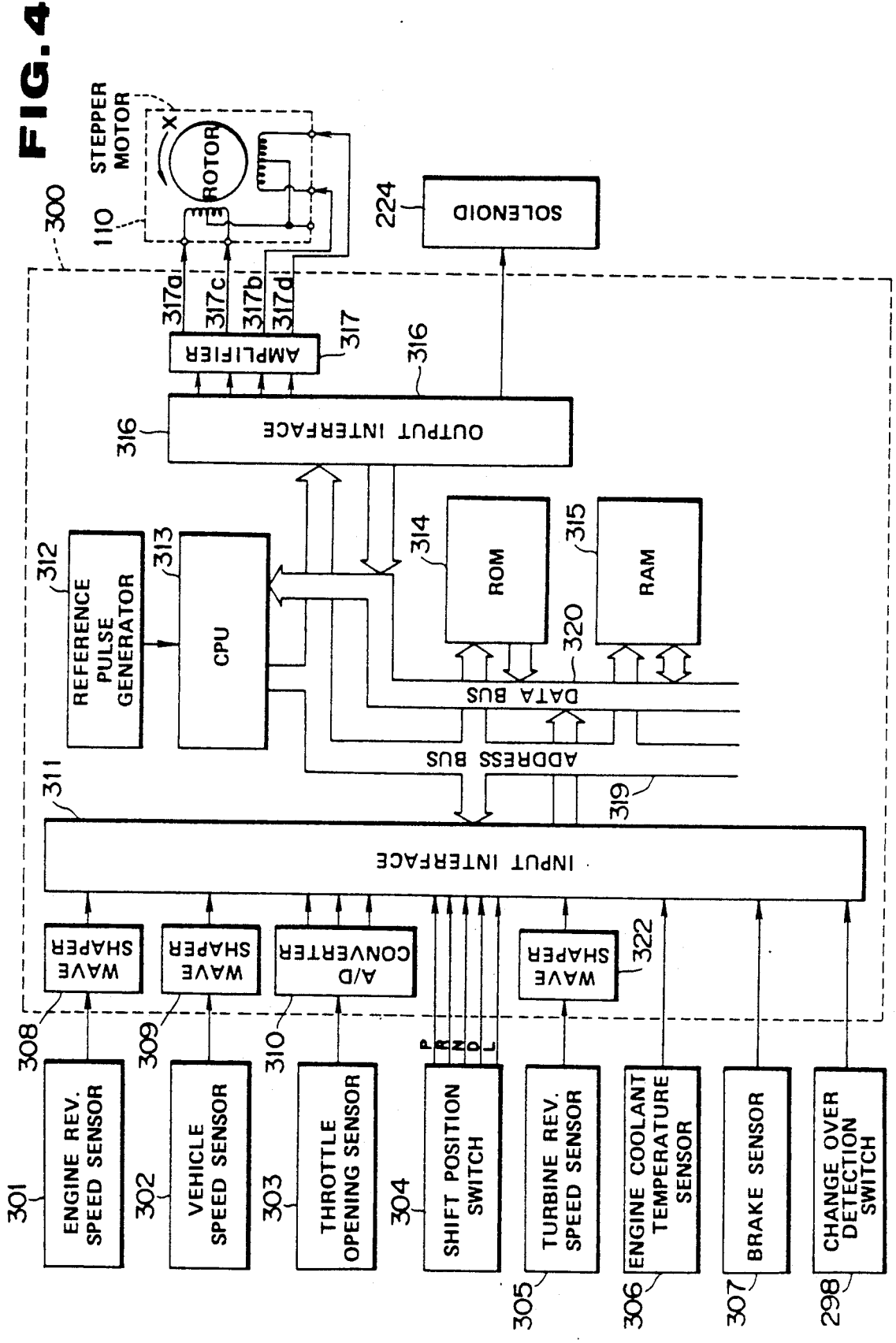
FIG. 4 is a block diagram showing a control unit.

Referring to the accompanying drawings, and particularly to FIG. 1, a drive system for a motor vehicle includes an engine with a fuel supply system in the form of a fuel injection unit 402 and a throttle valve which opens in degrees in response to a depressed position of an accelerator pedal in a conventional manner. The engine is followed by a continuously variable transmission 11. A throttle opening sensor 303 detects an opening degree of the throttle valve and generates a throttle opening degree indicative signal indicative of the throttle opening degree. Since the throttle valve opens in response to depression of the accelerator pedal, the throttle opening degree indicative signal generated by the sensor 303 is also indicative of a degree of a power demand on the engine 10. There are other signals which are indicative of a degree of a power demand on the engine 10, such as an accelerator pedal position indicative signal. Thus, the throttle opening degree indicative signal is just an example of a power demand indicative signal. A turbine revolution speed sensor 305 detects a revolution speed of a turbine shaft which serves as an input shaft of the continuously variable transmission 11 and generates a turbine revolution speed indicative signal indicative of the turbine revolution speed detected. A vehicle speed sensor 302 detects a revolution speed of an output shaft of the continuously variable transmission 11 and generates a vehicle speed indicative signal indicative of the output shaft revolution speed detected. The output signals of the throttle opening sensor 303, turbine revolution speed sensor 305 and vehicle speed sensor 302 are supplied to a transmission control unit 300. Also supplied to this control unit 300 are output signals of an engine revolution speed sensor 301, a shift position switch 304, an engine coolant temperature sensor 306, a brake sensor 307, and a change over detection switch 298 as shown in FIG. 4. During forward travel of the motor vehicle, the transmission control unit 300 supplies an engine control unit 400 with a shift position indicative signal reflecting that one of a manual forward drive position (D range position) or an engine braking forward drive position (L range position) which the continuously variable transmission is conditioned in. In response to the shift position indicative signal and other signals indicative of operational states of the engine 10 and the transmission 11, the engine control unit 400 executes programs as illustrated in the flowcharts shown in FIGS. 5 and 6. An output signal of the engine control unit 400 is supplied to the fuel injection control unit 402.

Referring to FIGS. 2, 3A, 3B, and 4, the continuously variable transmission 11 with the control unit 300 are illustrated. Detailed description along with these Figures are omitted since FIGS. 3A, 3B, 2, and 4 are the same as FIGS. 1A, 1B, 2, and 3 of U.S. Pat. No. 4,735,113 (Yamamuro et al.) which has been hereby incorporated by reference in its entirety. This United States Patent corresponds to EP-A·0180209 published on May 7, 1986. This EP document has been hereby incorporated by reference in its entirety.

Figure 5:
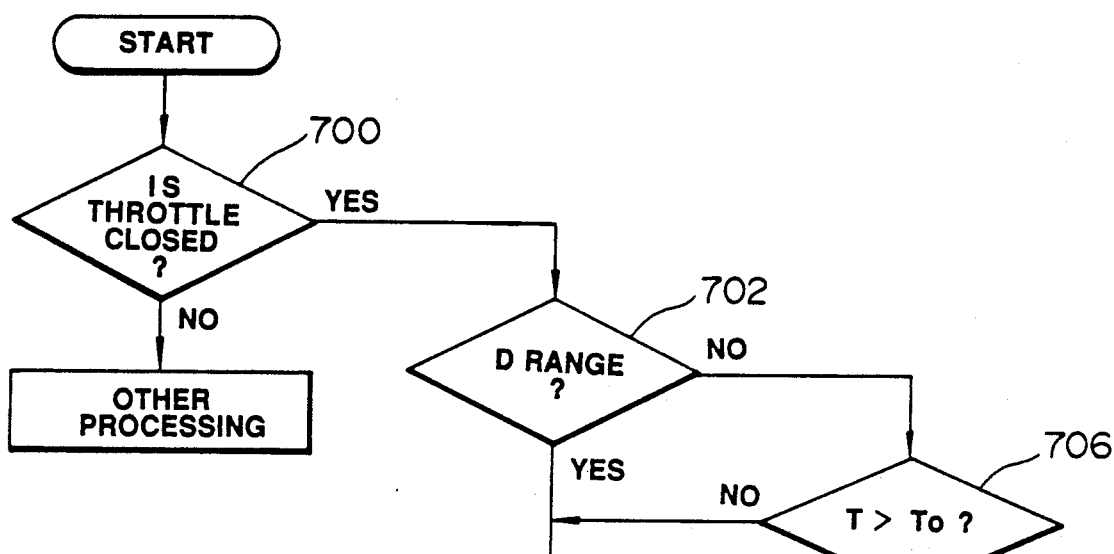
FIG. 5 is a flowchart.
Figure 6:
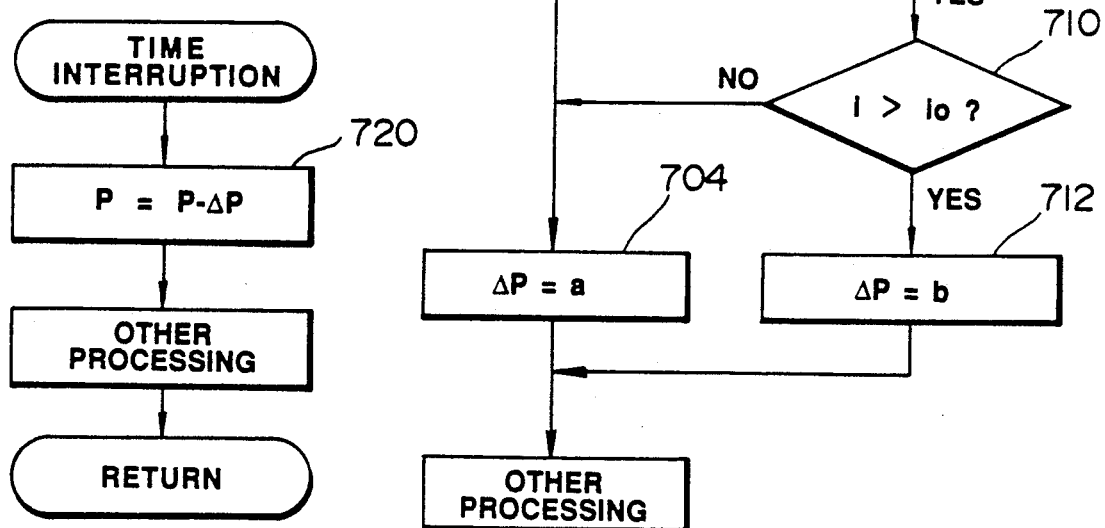
FIG. 6 is a flowchart.

Referring back to FIG. 1, the transmission control unit 300 calculates a reduction ratio i by dividing Nt by V. Nt and V are indicative of a turbine revolution speed and a vehicle speed stored after reading output signals of the turbine revolution speed sensor 305 and vehicle speed sensor 302. The engine control unit 400 executes programs as shown in FIGS. 5 and 6. Referring to FIG. 5, at a step 700, it is determined whether the throttle valve is closed or not after comparing a throttle opening degree TH with a predetermined small throttle opening degree value. If an inquiry at the step 700 is YES, that is, the throttle valve is closed, the program proceeds to a step 702 where it is determined whether the D range position is selected or not based on the shift position indicative signal. If the D range position is selected, the program proceeds to a step 704 where delta P is set equal to a first predetermined constant a. If the shift position indicative signal reflects that the L range position is selected, the program proceeds from the step 702 to a step 706 where it is determined whether the engine coolant temperature T is greater than a predetermined temperature value $T_0$ or not. If the temperature T is greater than the value $T_0$, the program proceeds to a step 708 where it is determined whether the vehicle speed V is greater than a predetermined vehicle speed value $V_0$ or not. If the vehicle speed V is greater than the value $V_0$, the program proceeds to a step 710 where it is determined whether the reduction ratio i is greater than a predetermined reduction ratio value $i_0$ or not. If the reduction ratio i is greater than the value $i_0$, the program proceeds to a step 712 where the delta P is set equal to a second predetermined constant b that is greater than the above-mentioned first predetermined constant a. From the preceding description, it is appreciated that when the continuously variable transmission 11 is conditioned in the engine braking forward drive position (L range position, step 702), delta P is set equal to the second predetermined constant b (step 712) upon a predetermined condition ($T > T_0, V > V_0$, and $i > i_0$) being satisfied after the throttle valve has been closed (see step 700). If this predetermined condition fails to be satisfied, delta P is set equal to the first predetermined constant a (step 704) even if the continuously variable transmission 11 is conditioned in the engine braking forward drive position (L range position). The execution of the program illustrated in FIG. 6 is initiated after elapse of a predetermined time period. In FIG. 6, at a step 720, a fuel injection pulse width P is decreased by delta P. Since the value b that is greater than the value a is set as delta P at step 712, the fuel injection pulse width P is decreased at a rate determined by the value b with respect to time (step 720). The fuel injection control unit 402 drops fuel injection amount at the rate b if delta P is set equal to the value b at the step 712, while at the different rate a if delta P is set equal to the value a at the step 704. Since the value b is greater than the value at a speed at which the fuel injection amount drops is quicker when the continuously variable transmission 11 is conditioned in the engine braking forward drive position (L range position) upon the predetermined condition ($T > T_0, V > V_0$, and $i > i_0$) being satisfied after the throttle valve has been closed than when the transmission 11 is conditioned in the normal forward drive position (D range position). It is appreciated that if the predetermined condition fails to be satisfied, the fuel injection amount drops at the rate determined by the value a even if the engine braking forward drive position (L range position) is selected.

Owing to the control discussed along with FIGS. 5 and 6, a torque generated by the engine 10 drops quickly when the continuously variable transmission 11 is conditioned in the engine braking forward drive position (L range position) upon the predetermined condition ($T > T_0, V > V_0$, and $i > i_0$) being satisfied after a power demand on the engine 10 has decreased to zero (see step 700). On the contrary, when the continuously variable transmission 11 is conditioned in the normal forward drive position (D range position), the engine torque drops less quickly after the power demand on the engine 10 has decreased to zero. Therefore, a shockless downshift operation of the continuously variable transmission during operation with the normal forward drive, position (D range position) and a sufficiently effective engine braking during operation with the engine braking forward drive position (L range position) have been accomplished.

What is claimed is:

1. An apparatus for a control of a torque generated by an engine drivingly connected to a continuously variable transmission for a motor vehicle, the engine including a fuel supply system, the continuously variable transmission having a plurality of shift positions including a normal forward drive position and an engine braking forward drive position, the apparatus comprising:
- means for generating a shift position indicative signal reflecting that one of the plurality of shift positions which the continuously variable transmission is conditioned in;
- means for detecting a power demand on the engine and generating a power demand indicative signal indicative of a degree of said power demand detected; and
- means responsive to said shift position indicative signal and said power demand indicative signal for effecting a drop in torque generated by the engine at a first rate with respect to time when the continuously variable transmission is conditioned in the normal forward drive position after the power demand has decreased to zero, but at a second rate with respect to time when the continuously variable transmission is conditioned in the engine braking forward drive position upon a predetermined condition being satisfied after the power demand has decreased to zero, said second rate being greater than said first rate.

2. An apparatus as claimed in claim 1, wherein said shift position indicative signal generating means includes a shift position switch means for generating an output signal indicative of a position which a manual valve of the continuously variable transmission is placed at.

3. An apparatus as claimed in claim 1, wherein said power demand indicative signal generating means includes a throttle opening degree sensor means for detecting an opening degree of a throttle valve of the engine and generating a throttle opening degree indicative signal indicative of the opening degree of the throttle valve detected.

4. An apparatus as claimed in claim 1, wherein said predetermined condition is satisfied when an engine temperature of the engine is greater than a predetermined temperature value, a vehicle speed of the motor vehicle is greater than a predetermined vehicle speed value, and a reduction ratio established in the continuously variable transmission is greater than a predetermined reduction ratio value.

5. A method for a control of a torque generated by an engine drivingly connected to a continuously variable transmission for a motor vehicle, the engine including a fuel supply system, the continuously variable transmission having a plurality of shift positions including a normal forward drive position and an engine braking forward drive position, the method comprising the steps of:
- generating a shift position indicative signal reflecting that one of the plurality of shift positions which the continuously variable transmission is conditioned in;
- detecting a power demand on the engine and generating a power demand indicative signal indicative of a degree of said power demand detected; and
- effecting, responsive to said shift position indicative signal and said power demand indicative signal, a drop in torque generated by the engine at a first rate with respect to time when the continuously variable transmission is conditioned in the normal forward drive position after the power demand has decreased to zero, but at a second rate with respect to time when the continuously variable transmission is conditioned in the engine braking forward drive position upon a predetermined condition being satisfied after the power demand has decreased to zero, said second rate being greater than said first rate.

* * * * *